United States Patent [19]
Kee

[11] 3,780,251
[45] Dec. 18, 1973

[54] MICROWAVE HEATING APPARATUS

[75] Inventor: David Montgomery Kee, London, England

[73] Assignee: Micromatic Systems Limited, London, England

[22] Filed: Jan. 3, 1972

[21] Appl. No.: 215,053

[52] U.S. Cl. .......................................... 219/10.55
[51] Int. Cl. ............................................. H05b 9/06
[58] Field of Search ................................. 219/10.55

[56] References Cited
UNITED STATES PATENTS

| 3,534,676 | 10/1970 | Rubino | 219/10.55 UX |
| 3,482,509 | 12/1969 | Gardner | 219/10.55 UX |
| 3,508,023 | 4/1970 | Veda et al. | 219/10.55 |
| 3,422,242 | 1/1969 | Miyata | 219/10.55 |
| 3,497,656 | 2/1970 | Staats et al. | 219/10.55 |
| 3,663,783 | 5/1972 | McKague et al. | 219/10.55 |
| 3,654,417 | 4/1972 | Javes et al. | 219/10.55 |

Primary Examiner—R. F. Staubly
Assistant Examiner—Hugh D. Jaeger
Attorney—Wooster, Davis & Cifelli

[57] ABSTRACT

Microwave heating apparatus includes a microwave energy source feeding microwave energy to a cavity tuned to resonate at the frequency of the source. The cavity has aligned inlet and outlet ports and doors for closing the inlet and outlet ports during heating of an article within the cavity. Means are provided for inhibiting operation of the source while either door is not fully closed, and there is also provided an arrangement for transporting articles to be heated through the cavity. The microwave source may be a klystron coupled to the cavity through a cylindrical launch tube whose length is variable for tuning the cavity. A system is provided for sensing the presence of an article at preselected points on its path along the transport arrangement, and is connected to control circuitry for controlling operation of the arrangement. The apparatus may include manually operable means for setting a preselected heating time, or a system for automatically terminating heating on the detection of a predetermined radiation level in the cavity.

10 Claims, 9 Drawing Figures

MICROWAVE HEATING APPARATUS

BACKGROUND OF THE INVENTION

The present invention concerns microwave heating apparatus, and more particularly a microwave oven.

Microwave ovens are very well known. An article to be cooked is placed in the oven, which consists of a tuned microwave cavity. Microwave energy from a suitable source, such as a klystron oscillator, is fed into the cavity, and passes through the article to be cooked. Most organic materials, such as are found in all food substances, undergo dielectric heating when microwave energy is passed through them. The effect is that all parts of the article are evenly heated, no matter how far they are from the surface of the article. In contrast, the conventional oven cooks articles from the outside towards the centre, with the result that the outer layers are always cooked more than the central layers. An obvious example of an article cooked in this way is a loaf of bread, or a rare steak where the centre portion of the meat can remain pink even when the outer layers are grilled to a deep brown colour.

Microwave heating is an advantageous means for performing operations such as sterilising, blanching, cooking and drying, and other purposes which require heating of the food. Heating is very rapid, as well as uniform throughout the interior of the material.

Another advantage of microwave heating is that the oven, the air inside it, and any container for an article to be cooked is relatively unaffected and suffers very little rise in temperature.

Microwave ovens have been proposed which resemble conventional ovens in that they consist of a heating chamber provided with a door. The door is opened, a piece of food is placed in the oven, the door is closed, and the oven is heated for the necessary time. The oven is then switched off, the door opened, and the food removed.

Ovens have also been proposed for the continuous or semi-continuous processing of foods and these are usually arranged as tunnel furnaces. As the inlets and outlets of the tunnel are open to permit the entry and exit of food there is a risk that the microwave energy may escape. Generally escape of energy is prevented by using relatively long inlet and outlet tunnels with the microwave heating element at the centre, as far as practicable from the inlet and outlet of the tunnels. In addition, various attenuation arrangements have been proposed, for example the use of hollow tunnel walls at the inlet and outlet with water circulating in the walls, water being an efficient attenuator of microwave energy. As this energy heats the water, the water may have to be circulated to prevent excessive rises in temperature.

SUMMARY OF THE INVENTION

In accordance with the invention, microwave heating apparatus comprises a microwave energy source, a cavity coupled to the energy source and tuned to resonate at the frequency of the source and having aligned inlet and outlet ports, an arrangement for transporting articles to be heated through the cavity, respective doors for closing the inlet and outlet ports during heating of an article within the cavity, and means for inhibiting operation of the source while either door is not fully closed.

The transport arrangement suitably comprises an endless belt passing through the cavity. The cavity inlet and outlet ports are preferably rectangular openings in the respective end walls of the cavity, the belt running through the cavity at the level of the lower edges of the openings, and the ports are suitably closed by moving the respective doors downwardly over the ports until a lower edge of each door contacts the belt.

Each door is suitably supported on and operated by a linkage arranged to provide a composite closing movement whereby each door is first moved to cover the respective port and then pulled inwardly to clamp edge portions of the inner side of the door firmly against the portions of the cavity end wall bordering the port.

The microwave energy source is suitably a klystron.

IN THE DRAWINGS

The invention will now be described in more detail, by way of examples only, with reference to the accompanying partly diagrammatic drawings in which.

DESCRIPTION OF THE PREFERRED EMBODIMENT

The microwave oven is assembled in a framework indicated generally at 1. The sides of the framework 1 are closed by readily detachable panels which are not shown in FIG. 1; the oven proper, indicated generally at 2, is disposed on the upper surface of the framework 1, and is covered by a fibre-glass shroud which is not shown in the Figure but whose position is indicated by the dotted line 3.

Figure 1:
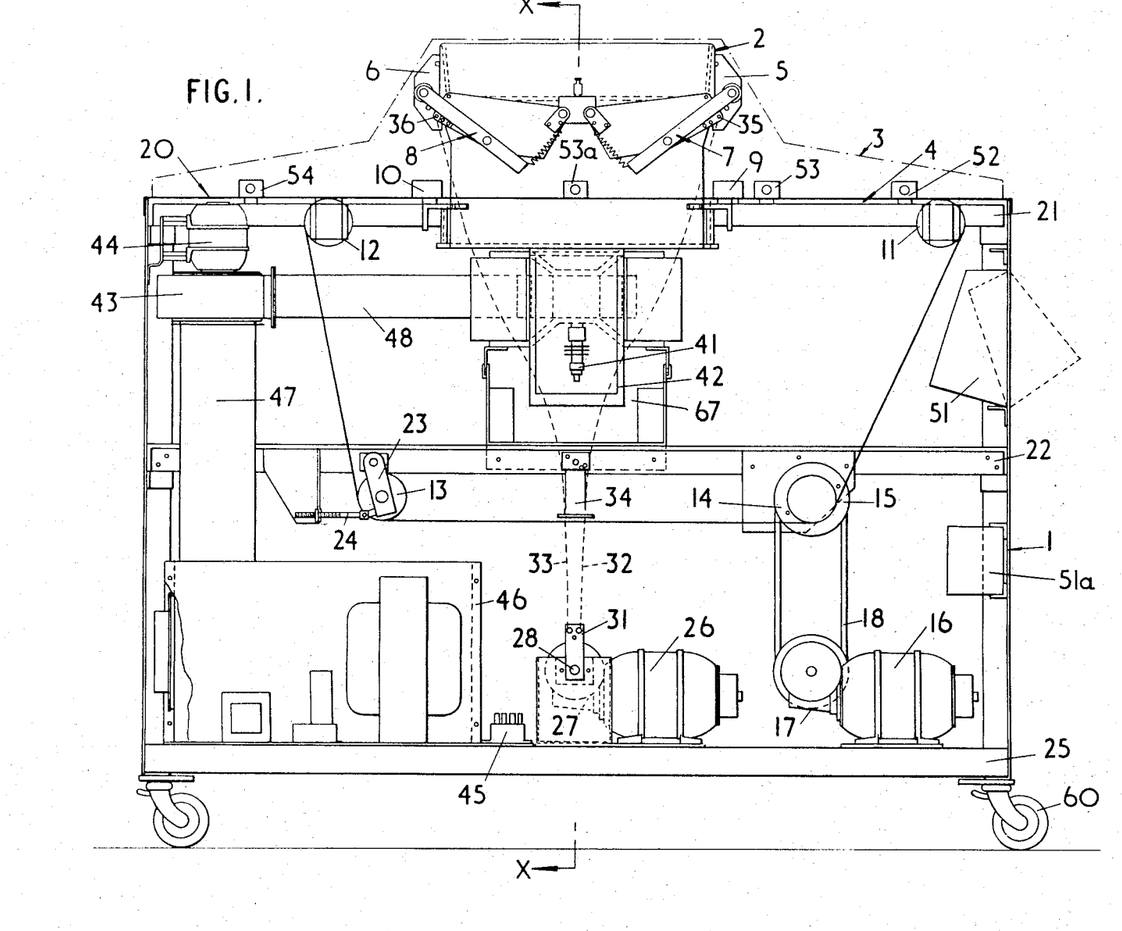
FIG. 1 is a general side elevation of microwave heating apparatus.

A polypropylene belt 4 runs along part of the upper surface of the framework 1, and passes through inlet and outlet ports of the oven 2. The oven ports may be closed by respective doors 5 and 6, supported on and actuated by respective linkages 7 and 8 which will be described in more detail below.

The belt 4 runs around four rollers 11, 12, 13, 14. The roller 14 carries a pulley 15 and is driven by an electric motor 16 via gearing 17 and a belt drive 18.

Although not shown in the Figure for the sake of simplicity, a further belt drive is arranged to run the roller 11 from the roller 14.

The rollers 11 and 12 are supported in a top frame 21 of the framework 1. The rollers 13 and 14 are supported in a lower frame 22, the roller 13 being connected to the lower frame 22 by a pair of links 23 provided with a tensioning device 24 for maintaining the tension in the belt.

The motor 16 is mounted on a bottom frame 25, which also supports a second electric motor 26 for actuating the doors 5 and 6. The motor 26 drives a shaft 28 through gearing 27.

Clamped on the shaft 28 is a lever 31 to which are secured the lower ends of two Bowden cables 32,33. The cables pass through a suspended lever 34 mounted on the lower frame 22 and are attached at 35 and 36 to the linkages 7 and 8 respectively. The suspended lever 34 ensures that the tensions in the two cables are substantially the same. The operation of the door actuator mechanism will be described in detail later. There is a corresponding system on the other side of the cavity, incorporating two further Bowden cables with suspended lever.

The oven 2 consists of a cavity tuned to resonate at a microwave frequency supplied by a klystron 41. The klystron is coupled to the cavity by a launch tube 42. The cavity and klystron arrangements will be described in more detail later.

The klystron is air-cooled by a blower 43 driven by a third electric motor 44, both mounted on the main frame 1. Air is drawn in through a louvred aperture (not shown) in the side of a housing 46 containing the transformers and other components of the power supply arrangements, and into an inlet duct 47 and passes over the switching assembly 45 which switches the motors and klystrons on and off. The air is blown along an outlet duct 48 and is directed through the cooling fins and onto the cathode of the klystron. From there it passes up the launch tube and into the cavity of the oven 2. It leaves the oven through perforations in the doors 5 and 6, carrying with it steam and cooking odours.

Control circuitry for the oven is housed in two boxes 51 and 51a. The box 51 is pivoted to the framework at its upper front edge and can be swung out from the retracted position in which it is shown in full in FIG. 1 to a forward position shown in dotted lines for ease of operation. Box 51a is attached to the main frame 1.

Spaced along one edge of the upper surface of the oven are four photo-sensitive elements 52, 53, 53a and 54. Opposite each of elements 52, 53, 53a is a respective lamp 55, 56, 56a, (not shown in FIG. 1). A fourth lamp (not shown) is opposite element 54.

Figure 2:
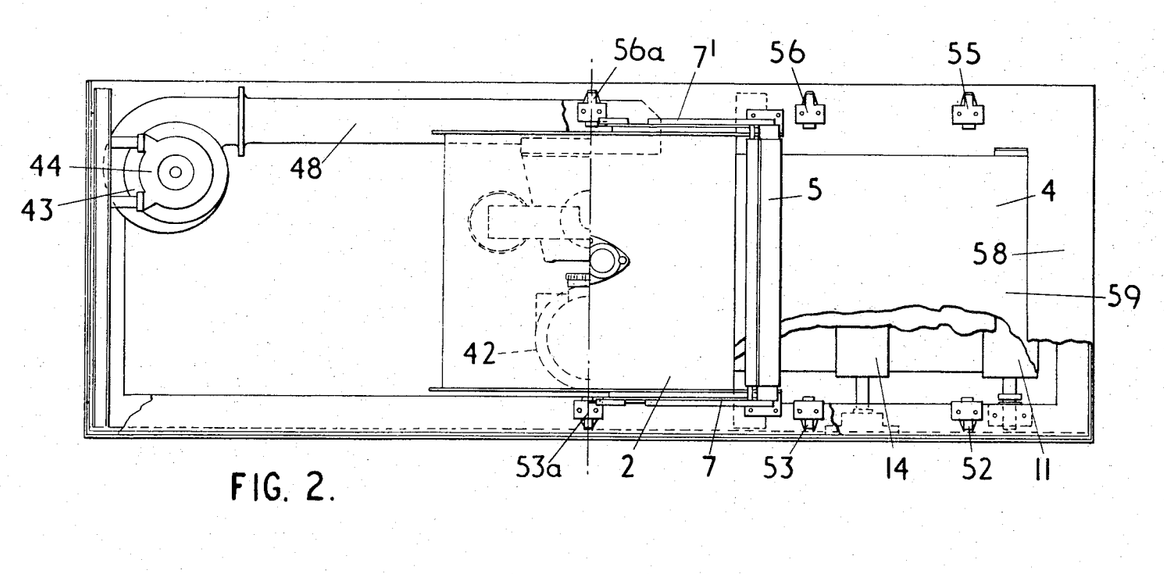
FIG. 2 is a plan view of the heating apparatus.

FIG. 2 shows the photo-sensitive elements 52, 53, and 53a and lamps 55, 56 and 56a. FIG. 2 also shows the upper run of the belt 4. A top-plate 58 lies over the belt which is exposed by a rectangular aperture 59. The lamp 55 and its photo-sensitive element 52 are just downstream of the beginning of the exposed belt, and the lamp 56 and photo-sensitive element 53 are just upstream of the entry to the oven 2. The third lamp 56a and its photo-sensitive element 53a are situated across the centre line of the cavity. The fourth lamp (not shown) and its photo-sensitive element 54 are just downstream of the end of the exposed belt. The oven is mounted on four castors, one of which is indicated at 60 in FIG. 1.

Figure 3:
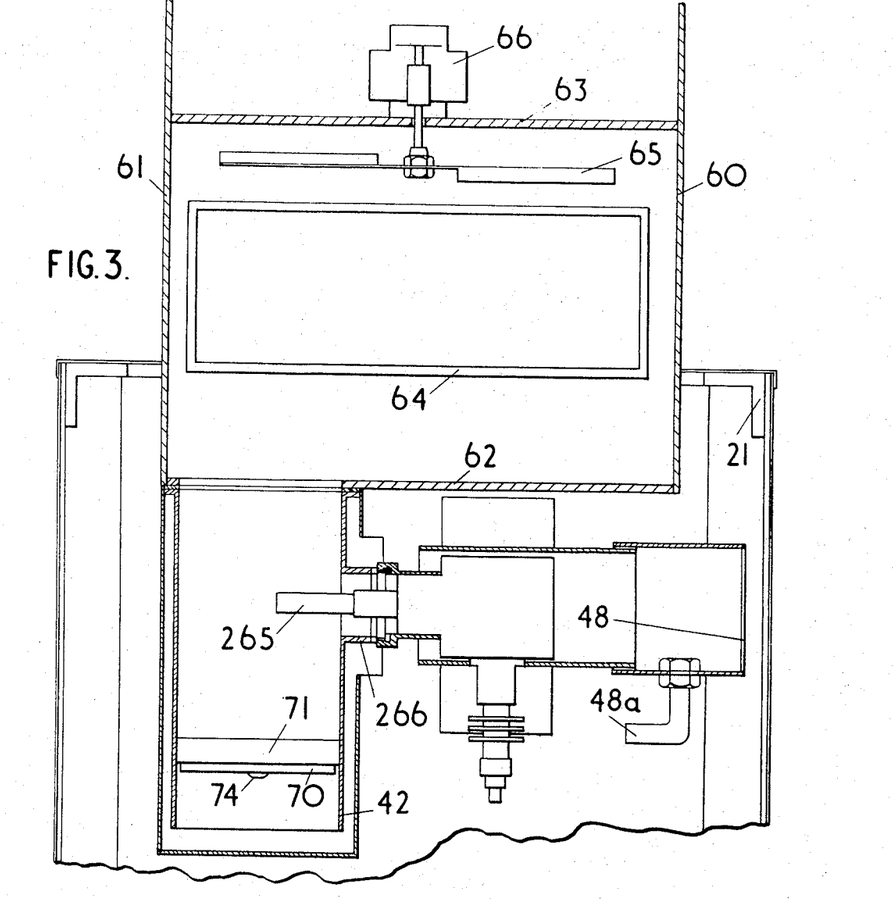
FIG. 3 is a section of the upper part of the apparatus, on the line and in the direction of the arrow X—X in FIG. 1.

Referring now to FIG. 3, the arrangement of the cavity and the launch tube is clearly seen.

The cavity comprises side walls 60, 61, floor 62 and ceiling 63. Front and rear walls with the oven inlet and outlet ports are not shown in FIG. 3.

The cavity is lined with a polypropylene shell 64 forming as inner tunnel through which the belt (not shown in FIG. 3) passes, resting on the floor of the inner tunnel. Between the cavity ceiling 63 and the roof of the shell 64 is a metal paddle or mode stirrer 65 whose drive motor 66 is mounted on the cavity ceiling, in the well formed by the side walls which extend higher than the ceiling. The metal paddle rotates while microwave energy is being fed into the cavity, and improves the energy distribution in the cavity, acting as a rotating reflector.

In the cavity floor 62 is a circular opening below which is mounted the launch tube 42, whose axis is vertical. The klystron probe 265 extends into the launch tube through a side tube 266.

The launch tube 42 is enclosed in a cylindrical housing 67. Inside the launch tube is an arrangement for tuning the coupling of the microwave energy into the cavity. The arrangement is shown to a larger scale in FIG. 4 and comprises a cruciform plate 70 which is mounted inside a cylindrical bottom cover 71 of the launch tube 42. The cover 71 has axial sawcuts 72 spaced around its periphery and a threaded boss 73 on its circular end face, which is perforated between the boss 73 and the cylindrical walls. The cruciform plate 70 is attached to the cover 71 by a screw 74 engaging the boss 73. The lower end of the inner wall of the cylinder 71 is flared outwardly, and the external diameter of the plate 70 is equal to the diameter of the cylinder about halfway along the flare.

Figure 4:
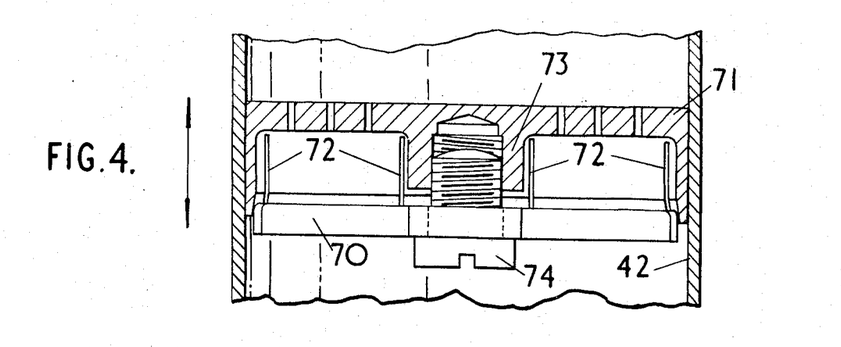
FIG. 4 is a section of an arrangement for tuning the microwave coupling of the apparatus.

As the screw 74 is tightened, the walls of the cylinder 71 expand, thanks to the sawcuts 72.

The cover 71 is placed in the launch tube 42 with the screw 74 slackened off. The walls are thus unexpanded and the cover is readily movable inside the launch tube. Tightening the screw 74 clamps the cover in position, but its position can be varied by slacking off the screw 74 slightly and moving the cover before retightening the screw 74. When the optimum position has been found, the screw is fully tightened to clamp the cover 71 firmly in place.

FIG. 3 also shows the air duct 49 and its extension 48a through which air is circulated round the klystron 41, through the launch tube 42 and into the cavity.

Figure 5:
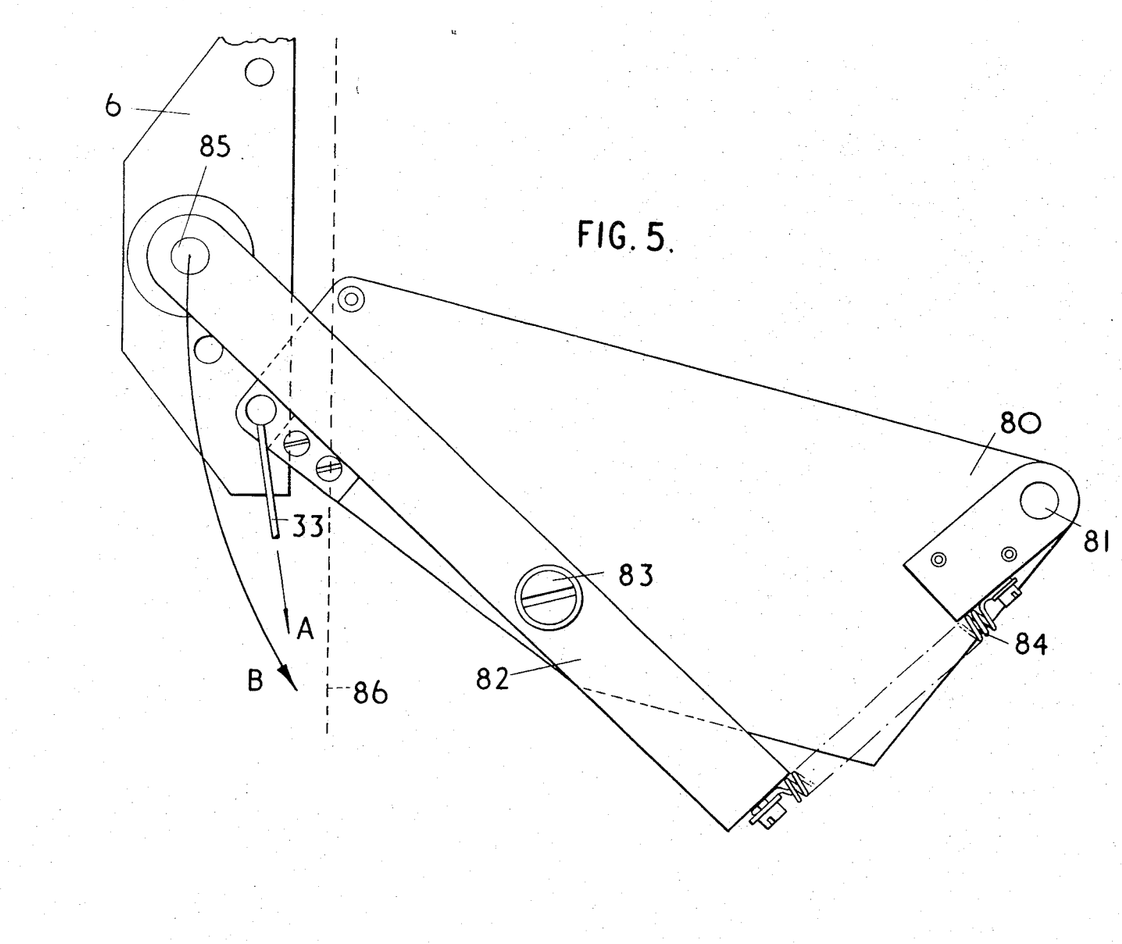
FIGS. 5 and 6 show raised and intermediate positions of one door of the apparatus.

FIG. 5 shows one side of one of the door mechanisms with the door 6 in the raised position. A first lever plate 80 is pivoted to the side wall of the cavity about a pin 81. The Bowden cable 33 is attached to the plate 80 at a point remote from the pin 81. A lever 82 is pivoted to the lever plate 80 about a pin 83, the pivot lying between the pin 81 and the point of attachment of the Bowden cable, and slightly below the line joining these points.

An inner end of the lever 82 is connected to the plate 80 adjacent the pin 81 by a spring 84. The outer end of the lever 82 carries one end of the door 6 which is pivoted to the lever about a pin 85. The door is kept generally vertical by a spring (not shown).

The vertical line 86 shows the plane of the outer surface of the cavity wall whose port is closed by the door 6. The mechanism operates as follows:

When the door closing mechanism is actuated, the Bowden cable 33 is pulled in the direction of the arrow A. The lever plate 80 turns about the pin 81, and the corresponding plate on the other side of the door turns with it, swinging the door through an arc indicated by the arrow B. At the same time, the other door is swung down in a corresponding arc. As the doors swing, they are kept substantially vertical by the springs (not shown) previously mentioned.

Figure 6:
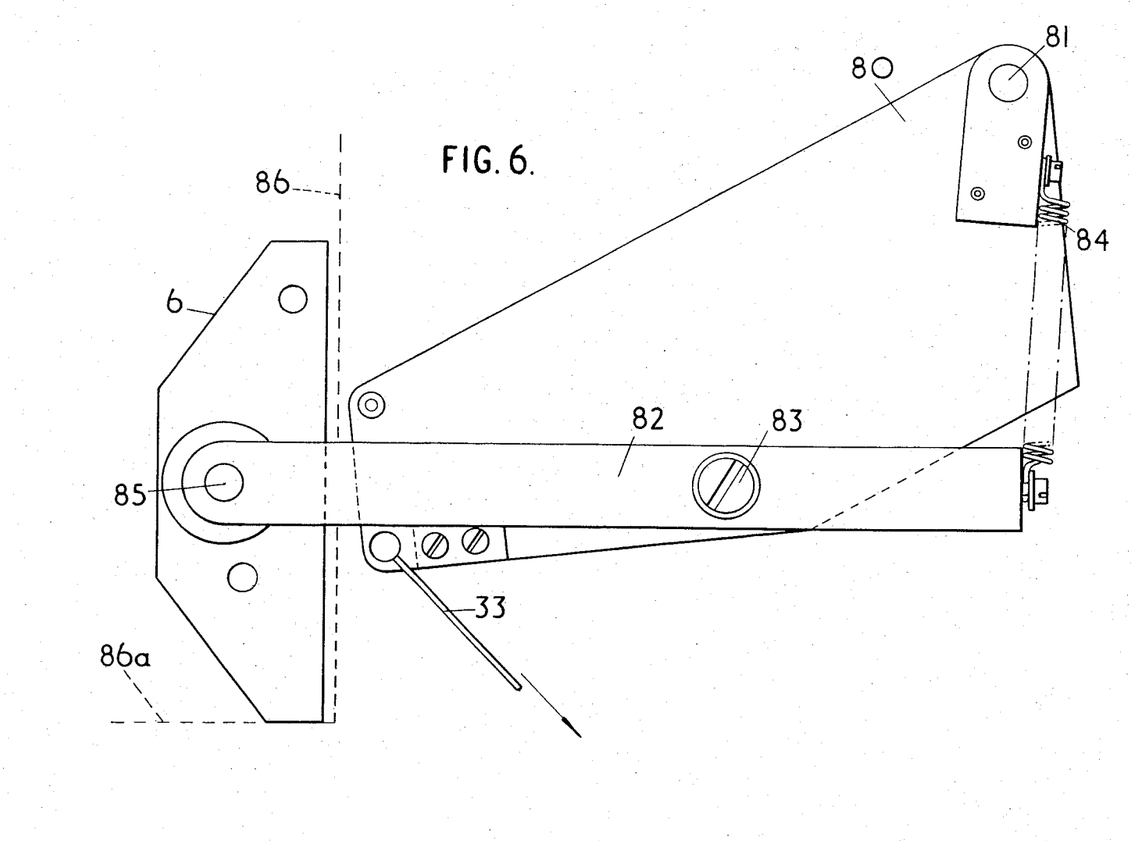

The door linkage is arranged so that when the lower side of the door contacts the belt shown by the dotted line 86a, further downward movement is prevented but the plate 80 continues to turn, and this further rotation of the plate 80 causes the lever 82 to turn about its pin 83 against the spring 84, and pulls the pin 83 to the right, so that the door is pulled tightly in against the cavity wall, (see FIG. 6).

It has been found that this door arrangement provides an efficient seal against loss of energy from the cavity. Furthermore, the doors are perforated to provide an exit path for steam and cooking fumes from the cavity, these being blown out through the perforations by the airstream from the blower, and it has been found that provided the perforations are sufficiently small, no loss of radiation occurs through them. The perforations used in this example are 3 millimetres in diameter, the microwave wavelength used being 12.5 centimetres. The doors each consist of a hollow shell of trapezoidal cross-section, the parallel inner and outer faces being so perforated.

Figures 7, 8, 9:
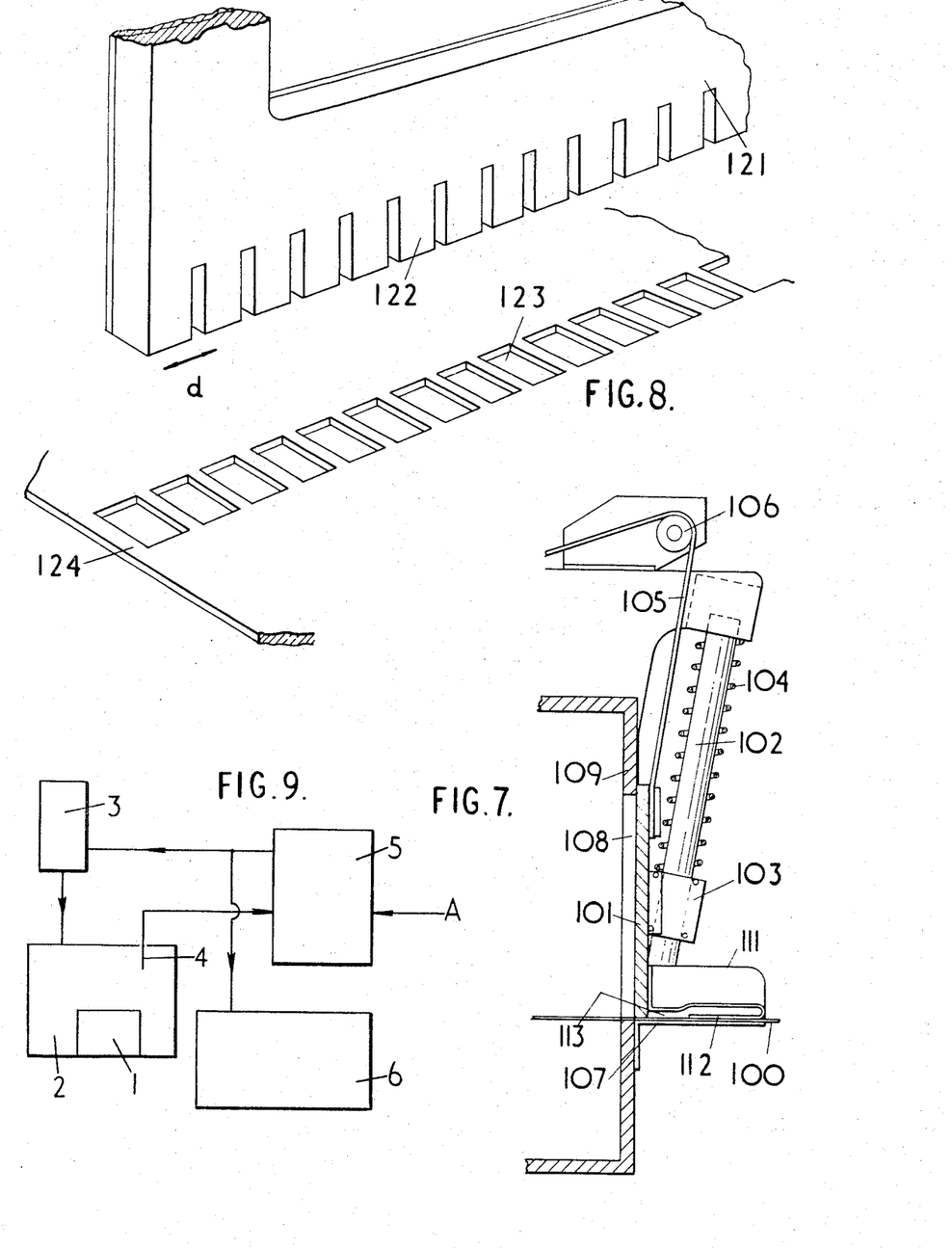
FIG. 7 shows another form of door mechanism.
FIG. 8 shows a third form of door mechanism.
FIG. 9 is a block diagram of an arrangement for automatically controlling the heating time of the apparatus.

While no radiation loss occurs with this door system, simpler door systems may be used and may suffer some loss. FIG. 7 shows diagrammatically another door arrangement.

The door 101 slides on a pair of inclined guides 102 on bearings 103, being movable upwardly against bias springs 104. The door is actuated by a pair of cords 105 passing over pulleys 106.

A reflector 107 is mounted below the belt 100 at the level of the lower edge of the port 108 in the cavity wall 109. The lower edge of the door 101 carries a radiation trap 111 consisting of a channel 112 with an opening 113 adjacent the lower edge of the door. Any radiation escaping under the door is reflected into the channel 112 which forms a short-circuited quarter-wave stub effectively attenuating the radiation.

FIG. 8 shows another form of door seal, in which the door 121 has a castellated lower edge whose castellations 122 pass through perforations 123 in the belt 124. By suitable choice of the space between castellations, in relation to the wavelength, loss of radiation can be substantially eliminated. Evidently precise placing of the belt is necessary, but the castellations may be given tapered ends to permit a wider tolerance of belt placing.

OPERATION

The operation of the oven will now be described, with reference to FIGS. 1 and 2.

The klystron is switched on and allowed to reach its operating temperature. The control circuitry of the oven is so arranged that cooking cannot be started before sufficient time has elapsed for this temperature to be reached.

Once the klystron is ready, a cooking time is selected by means of a control on the control box 51.

An article to be cooked, in a suitable container such as a plastics dish, is then placed on the input end of the belt between the lamp 55 and photo-sensitive element 52. The light beam from the lamp is cut by the article and the control circuitry responds by starting the belt moving, switching on the motor 16. The belt moves anti-clockwise as shown in FIG. 1, and the article is carried into the oven. As it passes the lamp 56 and photo-sensitive element 53, another light beam is cut and the motor 16 is switched off with a delay to ensure that the belt carries the article into the cavity. As the motor 16 is cut off, the motor 26 is energised and closes the doors 5 and 6. The door linkages are arranged to operate four microswitches, of which two are shown in FIG. 1 at 9 and 10, two others being mounted in the corresponding positions on the opposite side of the oven, when the doors reach the fully closed position. Simultaneous operation of all four microswitches indicates that the doors are properly closed. The article on entering the cavity cuts the light beam from the photosensitive element 53a and actuates the klystron to feed power into the cavity for the preselected cooking time, when the doors are fully closed.

At the end of this time the klystron is deactivated the doors open, and the belt re-starts, moving the article now cooked, out of the cavity. The article runs off the belt onto a delivery panel shown at 20 in FIG. 1, between a lamp (not shown) and the photo-sensitive element 54. Interruption of this beam switches off the motor 16 and stops the belt. The cycle can then be repeated, with a different preselected cooking time if necessary.

It will be appreciated that the oven will not operate until both doors are fully closed, since all four microswitches must first be activated. There is thus no risk that microwave energy will escape due to operation of the klystron with the oven doors open. It is also impossible for the oven to operate should an operator's hand be in the cavity, since the operator's arm will then prevent one of the doors from closing. The door closing force is not sufficient to injure the operator's arm should the door mechanism be accidentally operated while the oven is being cleaned for example.

The oven can be used free standing by an operator, or connected into automatic vending apparatus for delivering and cooking articles selected by push buttons and the like. It is constructed so that it can be used in the latter role simply by wheeling it into a station in the vending machine and connecting its control circuitry to the selector circuitry of the vending machine, which is suitably arranged to set the cooking time appropriate to a selected article.

MODIFICATION

While a plain belt has been shown in the drawings, since it has been found that friction between the belt and articles to be cooked is sufficient to move the articles through the oven, transverse walls or pleats may be provided on the belt and an article placed between them, being pushed forward by the pleat behind it. The pleat spacing will suitably be slightly less than the length of the oven, and the arrangements for stopping the belt will be arranged to ensure that a pair of pleats is inside the cavity before the doors are closed.

It has been observed that as food becomes cooked it progressively absorbs less and less microwave radiation.

The radiation level in the cavity obtained when an article is fully cooked may be determined, empirically for example, and the detector set to de-energise the microwave source and to cause the article to be removed from the cavity when this level is attained. Thereafter, it will only be necessary to introduce the article into the cavity for it to be automatically cooked for the appropriate time.

A single setting of the detector will serve for a wide range of foods, since foods which require less cooking begin to "reject" the microwave radiation more quickly. In other words, for articles requiring less cooking the radiation level in the cavity rises to the threshold value more quickly, so that the microwave source is de-energised sooner than for articles requiring more cooking.

Thus this one setting of the detector permits a wide variety of foods to be cooked entirely automatically for the appropriate length of time.

The timer circuitry is no longer necessary, and, where the apparatus is used in a completely automatic context, in a food vending machine, for example, the control circuitry is much simplified as there is no need to select a heating time for each type of food which may be supplied.

FIG. 9 shows an article 1 in the cavity 2. The microwave source 3 is coupled to the cavity 2. A probe 4 senses the radiation level inside the cavity 2. It is coupled to a detector 5 outside the cavity to provide an indication of the radiation level. The point where the probe or its connections leave the cavity is sealed against loss of radiation, in a conventional manner.

A preselected radiation level may be set in the detector 5, by means of the input indicated A in the figure. When the level in the cavity coincides with the preselected level, the detector 5 de-energises the microwave source 3, and simultaneously applies a signal to the transport arrangement and door operating mechanism 6 of the heating apparatus to cause the article 1 to be removed from the cavity.

I claim:

1. Microwave heating apparatus comprising:
a microwave energy source,
means defining a cavity coupled to the energy source and tuned to resonate at the frequency of the source,
an inlet port in a first side of said cavity,
an outlet port in a second side of said cavity,
an arrangement for transporting articles to be heated into the cavity through the inlet port, for holding the articles stationary in the cavity during heating, and for removing the heated articles from the cavity through the outlet port,
respective doors for closing the inlet and outlet ports during heating of an article within the cavity, a portion of the inner surface of each door when closed defining part of the respective cavity wall, and
means for inhibiting operation of the source while either door is not fully closed,
wherein said cavity includes spaced side walls and spaced end walls defining therebetween a generally rectangular space,
wherein said inlet and outlet ports comprise respective rectangular openings in said end walls,
wherein said transport arrangement comprises a motordriven endless belt of dielectric material arranged to run through said cavity at the level of lower edges of said inlet and outlet ports, and
wherein said doors are operable to close said ports by respective downward movements across said ports until a lower edge of each door contacts said belt, followed by respective inward movements to clamp said doors firmly over said ports.

2. Microwave heating apparatus comprising:
a microwave energy source,
means defining a cavity coupled to the energy source and tuned to resonate at the frequency of the source,
an inlet port in a first side of said cavity,
an outlet port in a second side of said cavity,
an arrangement for transporting articles to be heated into the cavity through the inlet port, for holding the articles stationary in the cavity during heating, and for removing the heated articles from the cavity through the outlet port, said transport arrangement comprising a belt arranged to run through said cavity at the level of lower edges of said inlet and outlet ports,
respective doors for closing the inlet and outlet ports during heating of an article within the cavity, a portion of the inner surface of each door when closed defining part of the respective cavity wall, and
means for inhibiting operation of the source while either door is not fully closed,
including a respective mechanism supporting each of said doors and operable to provide a composite door closing movement to initially move said doors downwardly across said inlet and outlet ports until a lower edge of each door contacts said belt and to then pull each door inwardly to clamp said doors firmly over said ports, each such mechanism comprising:
parallel first levers pivoted about a common axis, one to each of said side walls;
door actuator means connected to a first point on each first lever remote from the axis thereof;
parallel second levers pivoted at respective points intermediate their ends one to each of said of said first levers at second points on the respective first levers remote from the axis thereof; and
respective resilient bias means linking a first end of each said second lever to a point on said respective first lever;
the second end of each said second lever being pivoted to one side of the respective door.

3. Apparatus as set forth in claim 13 wherein said cavity further includes a shell of dielectric material forming a tunnel in said cavity and spaced from said side and end walls, through which articles to be heated are passed, said endless belt running along the floor of said tunnel.

4. Microwave heating apparatus comprising:
a microwave energy source,
means defining a cavity coupled to the energy source and tuned to resonate at the frequency of the source,
an inlet port in a first side of said cavity,
an outlet port in a second side of said cavity,
an arrangement for transporting articles to be heated into the cavity through the inlet port, for holding the articles stationary in the cavity during heating, and for removing the heated articles from the cavity through the outlet port,
respective doors for closing the inlet and outlet ports during the heating of an article within the cavity, a portion of the inner surface of each door when closed defining part of the respective cavity wall, and
means for inhibiting operation of the source while either door is not fully closed,
in which apparatus said cavity includes spaced side walls and spaced end walls defining therebetween a generally rectangular space, said inlet and outlet ports comprise respective openings in said end walls, said transport arrangement is arranged to run through said cavity at the level of lower edges of said inlet and outlet ports, and said doors are operable to close said ports by respective downward movement across said ports.

5. Apparatus as set forth in claim 4, wherein said downward movements of said doors across said ports are followed by respective inward movements of said doors to clamp the same firmly over said ports.

6. Apparatus as set forth in claim 4, wherein said inlet and outlet ports comprise respective rectangular openings in said end walls.

7. Apparatus as set forth in claim 4, wherein said transport arrangement comprises a motor-driven endless belt.

8. Apparatus as set forth in claim 7, wherein said motor-driven endless belt is of a dielectric material.

9. Apparatus as set forth in claim 4, including a respective mechanism supporting each of said doors and operable to provide a composite door closing movement to initially move said doors downwardly across said inlet and outlet ports until a lower edge of each door contacts said belt and then to pull each door inwardly to clamp said doors firmly over said ports, each such mechanism comprising:

parallel first levers pivoted about a common axis, one to each of said side walls;

door actuator means connected to a first point on each first lever remote from the axis thereof;

parallel second levers pivoted at respective points intermediate their ends one to each of said first levers at second points on the respective first levers remote from the axes thereof; and respective resilient bias means linking a first end of each said second lever to a point on said respective first lever;

the second end of each said second lever being pivoted to one side of the respective door.

10. Apparatus as set forth in claim 4, wherein said cavity further includes a shell of dielectric material forming a tunnel in said cavity and spaced from said side and end walls, through which articles to be heated are passed, said endless belt running along the floor of said tunnel.

* * * * *

UNITED STATES PATENT OFFICE
CERTIFICATE OF CORRECTION

Patent No. 3,780,251                    Dated December 18, 1973

Inventor(s) DAVID MONTGOMERY KEE

It is certified that error appears in the above-identified patent and that said Letters Patent are hereby corrected as shown below:

Column 2, line 56, "via" should read -- *via* -- .

Column 4, line 37, "49" should read -- 48 -- . Column 8, line 37 (Claim 3), "13" should read -- 1 -- .

Signed and sealed this 6th day of August 1974.

(SEAL)
Attest:

McCOY M. GIBSON, JR.          C. MARSHALL DANN
Attesting Officer              Commissioner of Patents